United States Patent
Anderson et al.

[11] Patent Number: 6,031,486
[45] Date of Patent: Feb. 29, 2000

[54] METHOD AND APPARATUS FOR INTEGRATION AND TESTING OF SATELLITES

[75] Inventors: Joseph F. Anderson, Rancho Palos Verdes; Raymond H. Renken, Rolling Hills Estates, both of Calif.

[73] Assignee: TRW Inc., Redondo Beach, Calif.

[21] Appl. No.: 09/204,924

[22] Filed: Dec. 3, 1998

[51] Int. Cl.[7] .................................................. G01S 7/40
[52] U.S. Cl. ..................... 342/165; 342/169; 342/173; 342/174
[58] Field of Search .................................. 342/165, 167, 342/168, 169, 170, 171, 172, 173, 174, 4; 434/2

[56] References Cited

U.S. PATENT DOCUMENTS

| | | | |
|---|---|---|---|
| 4,218,683 | 8/1980 | Hemming | 343/703 |
| 4,387,467 | 6/1983 | Kirby | 378/68 |
| 4,523,196 | 6/1985 | Gieraths | 342/172 |
| 4,730,191 | 3/1988 | Groebke | 342/169 |
| 4,785,955 | 11/1988 | Sasaki | 220/3 |
| 4,884,078 | 11/1989 | Fishkin et al. | 342/360 |
| 5,133,663 | 7/1992 | Willingham et al. | 434/2 |
| 5,150,127 | 9/1992 | Aw | 342/169 |
| 5,420,597 | 5/1995 | Duncan | 343/703 |

FOREIGN PATENT DOCUMENTS 10274393  10/1998  Japan .............................. F17C 3/10

OTHER PUBLICATIONS

"Prelaunch calibration of the advanced microwave sounding unit–A for NOAA–K", Mo, T., Microwave Theory and Techniques, IEEE Transactions on vol.: 44 8, Aug. 1996, pp. 1460–1469.

"Multidisciplinary modeling and design of a space system", Tester, J.T.; Robinson, D.G., Systems Engineering, 1991., IEEE International Conference on , 1991, pp. 446–449.

*Primary Examiner*—John B. Sotomayor
*Attorney, Agent, or Firm*—Michael S. Yatsko

[57] ABSTRACT

A satellite integration and testing system and method in which a satellite (12) is assembled and many tests are performed on it in a single test chamber (10), thereby avoiding multiple setup and tear-down operations required if multiple test chambers are used, and avoiding the need to move the satellite between test chambers.

16 Claims, 1 Drawing Sheet

METHOD AND APPARATUS FOR INTEGRATION AND TESTING OF SATELLITES

BACKGROUND OF THE INVENTION

This invention relates generally to earth-orbiting satellites and, more particularly, to techniques for integration and testing of satellites prior to launching them into orbit. A satellite includes many inter-dependent subsystems that are typically constructed separately and must be integrated into the satellite and then tested under simulated operational conditions. Prior to the present invention, various performance and environmental tests were performed in separate test chambers in which a newly assembled satellite was temporarily installed.

Satellite integration and test (I&T) requires moving the satellite through these test chambers and to other work areas. Each time the satellite is moved from one chamber to another, there is a required tear-down and setup of the I&T equipment, and means must be provided for transporting the satellite between test chambers.

In the past, integration and testing of a single satellite has taken many months, or even years, to perform, and much of this time is attributable to the labor intensive tasks of tear-down, setup, and satellite transportation. Therefore, the production of a single satellite has been a very time-consuming and expensive task, often taking as long as two years to complete integration and testing. In recent years, the use of satellites in communications and in other applications has been increasing at a rapid pace. Proposals for communication systems, navigation systems and other applications of satellites call for the launching of large numbers of orbiting spacecraft over a relatively short time span. Accordingly, there is a significant need for more efficient satellite manufacturing techniques that will reduce the time and cost of satellites from manufacture to launch. Reducing the time and cost of integration and testing of satellites would help to alleviate this need. The present invention is directed to this end.

SUMMARY OF THE INVENTION

The present invention resides in apparatus, and a related method for its use, for integrating and testing satellites in a single test chamber, thereby saving the time and expense of repeated tear-down and setup operations, and the time and expense of moving the satellite between multiple test chambers.

Briefly, and in general terms, the apparatus of the invention comprises a test chamber having a movable fixture on which a satellite is installable for testing; an inlet port for introducing gas at a controlled temperature for purposes of thermal testing; a shaking device coupled to the movable fixture, for simulating mechanical vibration of the satellite encountered at launch; an acoustic source mounted in the chamber to simulate acoustic vibration encountered at launch; a radio-frequency test antenna mounted in the chamber to simulate the position of an earth-based antenna; a sun simulator mounted in the chamber to simulate the angular position and diameter of the sun for purposes of testing a sun sensing device on the satellite; and an earth simulator mounted in the chamber to simulate the angular position and diameter of the earth for purposes of testing an earth sensing device on the satellite.

More specifically, the movable fixture for supporting the satellite is movable vertically and is capable of rotation about at least two axes to simulate orientation movements of the satellite when in orbit. The apparatus may further comprise a permanent source of satellite electrical power in the chamber, to simulate an onboard satellite power source, and a permanent data connection through a wall of the chamber, to provide a data connection between the satellite under test and test equipment external to the chamber. Another feature of the apparatus is at least one additional antenna mounted in the EMC/RF-shielded chamber to provide electromagnetic radiation to test the electromagnetic capatibility (EMC) of the satellite. For further convenience and efficiency of operation, the apparatus may further comprise equipment moving devices permanently installed in the chamber, to facilitate integration of the satellite in the chamber. The equipment moving devices may include movable slings installed in an upper wall of the chamber, and robotic assembly devices installed in the chamber.

The invention may also be defined in terms of a method for integrating and testing a satellite, comprising the steps of assembling a satellite on a permanently installed but movable fixture in a test chamber; rotating, translating and tilting the movable fixture to simulate orientation movements of the satellite for test purposes; introducing gas into the test chamber and controlling its temperature and pressure for purposes of thermal testing and pressure testing; shaking the movable fixture to simulate mechanical vibration of the satellite encountered at launch; providing acoustic vibration from an acoustic source mounted in the chamber to simulate acoustic vibration encountered at launch; transmitting radio-frequency (RF) radiation from an RF test antenna mounted in the chamber to simulate the position of an earth-based antenna; simulating with a sun simulator mounted in the chamber, the angular position and diameter of the sun for purposes of testing a sun sensing device on the satellite; and simulating with an earth simulator mounted in the chamber, the angular position and diameter of the earth for purposes of testing an earth sensing device on the satellite.

More specifically, the steps of rotating, translating and tilting the movable fixture include translating the fixture vertically and selectively rotating the fixture about at least two axes. The method may also include the steps of supplying electrical power to the satellite in the chamber through a permanent source of satellite electrical power in the chamber, to simulate an onboard satellite power source, and supplying a permanent data connection through a wall of the chamber, to provide a data connection between the satellite under test and test equipment external to the chamber.

In accordance with another feature, the method may further comprise transmitting RF radiation from at least one additional antenna mounted in the EMC/RF-shielded chamber to test the electromagnetic capatibility (EMC) of the satellite. The step of assembling the satellite includes employing equipment moving devices permanently installed in the chamber, to facilitate integration of the satellite in the chamber. More specifically, the step of employing equipment moving devices includes employing movable slings installed in an upper wall of the chamber, and employing robotic assembly devices installed in the chamber.

It will be appreciated from this summary that the invention provides a valuable improvement over conventional satellite integration and testing procedures, in that only a single test chamber is needed, and the invention provides that many environmental and functional tests are performed without having to move the satellite through several different test chambers. Thus the invention provides significant savings in both the time and the cost of integration and testing of satellites. Other aspects and advantages of the

DESCRIPTION OF THE PREFERRED EMBODIMENT

Figure 1:
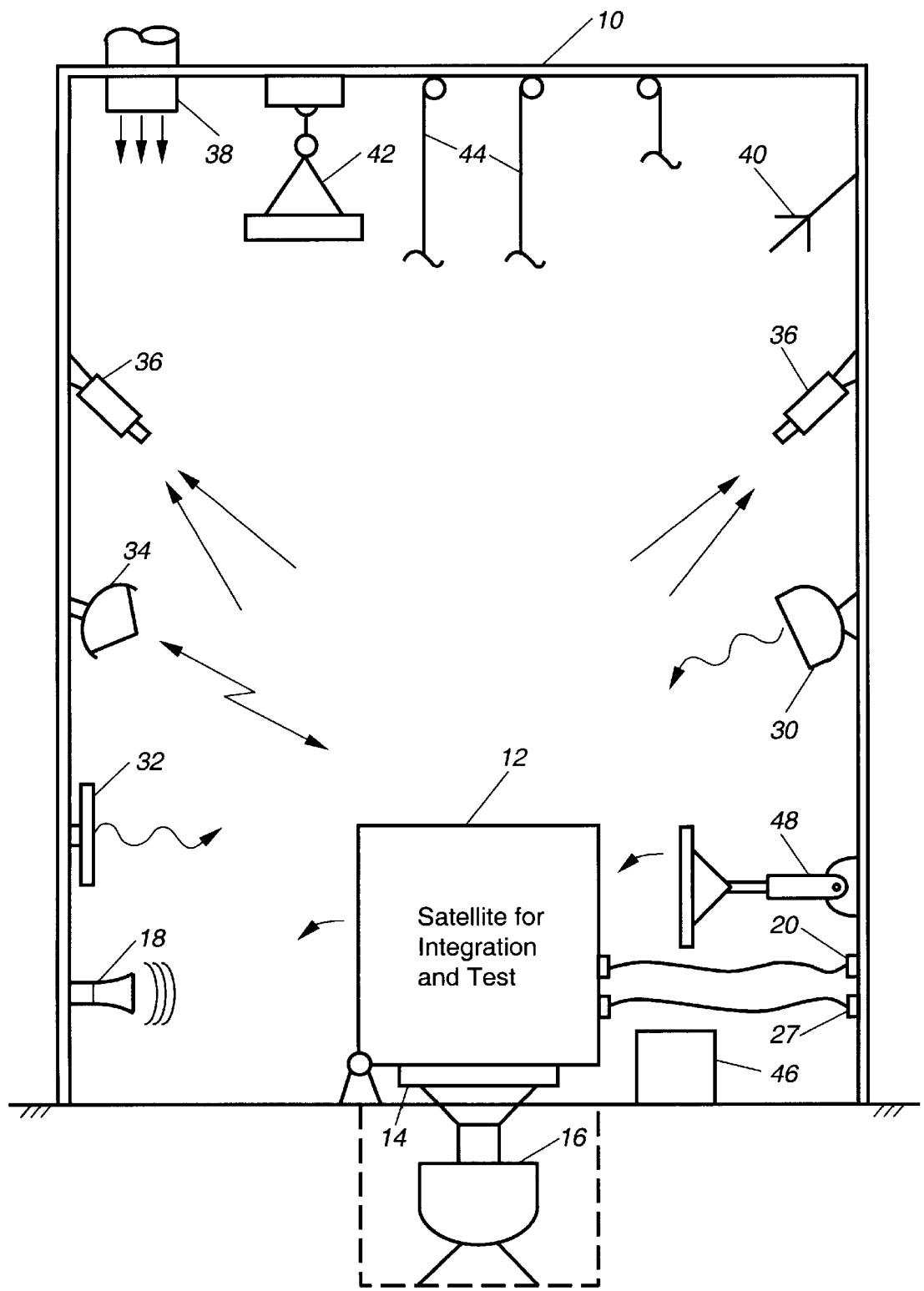
FIG. 1 is simplified elevational view depicting a satellite under integration and test in a single test chamber in accordance with the present invention.

As shown in the drawing for purposes of illustration, the present invention pertains to integration and testing of earth-orbiting satellites or similar spacecraft. In the past, satellites have been assembled and tested in multiple test chambers and other work areas, with each test chamber being designed to test a particular aspect of satellite operation or a particular subsystem of the satellite. For example, one test chamber would be designed to test the satellite for operation in the presence of mechanical and acoustic vibration, and another would be designed to test for operation in various temperature conditions. Additional chambers would be used for electromagnetic radiation capability (EMC), proper antenna operation, infrared (IR) and sun sensor operation, earth sensor operation, hazardous pressure environments, and calibration of videogrammetry equipment.

In accordance with the present invention, a satellite is integrated and tested in a single test chamber, thereby saving the construction of multiple test chambers and avoiding multiple setup and tear-operations and the need to move the satellite from one test chamber to another during integration and test. Other additional advantages are obtained when the invention is used, as further discussed below.

FIG. 1 depicts a presently preferred embodiment of the invention, including a single test chamber, indicated by reference numeral 10, in which a satellite 12 is assembled and tested. A key aspect of the invention is that many testing components are permanently mounted in the chamber 10, so that a full range of tests can be conducted in a short time span and, in some cases, practically simultaneously.

The satellite 12 is mounted on a permanent platform 14 that is rotatable about a vertical axis, movable up and down vertically capable of tilting over sideways to a limited degree, to simulate the effects of satellite orientation movements in space. The platform 14 has an associated shaker mechanism 16 to simulate mechanical vibration encountered when the satellite is carried in a launch vehicle. An acoustic test horn 18 is installed in a chamber wall near the satellite 12, to simulate acoustic vibration encountered during launch from the earth's surface.

Also installed in a wall of the chamber 10 is a permanent power outlet 20, which provides power to the satellite in the same form in which it is received from onboard power supplies, such as at 28 volts DC. Testing a solar array is beyond the capability of the test chamber because modern solar arrays are as large as 40–50 feet (12–15 meters) in diameter and providing an adequately powered solar energy substitute in the chamber poses practical difficulties. Therefore, solar array testing is usually performed in some other manner and electrical power is supplied to the satellite 12 through the outlet 20.

The chamber 10 also has a data connector 27 built into a chamber wall, for convenient connection of test data output from the satellite.

Also permanently installed in a wall of the chamber 10 is a sun simulator 30. This is to simulate the sun for testing sun-sensing equipment employed on many satellites for navigational purposes. Similarly, a permanent earth simulator 32 simulates radiation from the earth, both in terms of the angular diameter of the earth at the intended satellite altitude, and the approximate spectral content of the radiation. Earth sensors are used on satellites to sense the angular position of the earth and the satellite altitude as measured by the earth's angular diameter.

A radio-frequency (RF) antenna 34 provides RF signals for testing various satellite systems.

A pair of videogrammetry cameras 36 are also permanently installed in the walls of the chamber 10, and are used for videogrammetry applications, such as satellite mechanical alignments.

The chamber 10 is hermetically sealed to create a clean testing environment, and to permit the introduction of air or other gas through an inlet port 38, for purposes of temperature cycle testing of the satellite 12. The chamber 10 is EMC/RF-shielded, and also has other permanently mounted internal antennas, one of which is shown at 40, for subjecting the satellite 10 to electromagnetic radiation at various frequencies and intensities, to test the satellite's electromagnetic capatibilities (EMC).

Other permanently installed components in the chamber 10 facilitate setup and assembly of the satellite 12. These include permanent mechanical aerospace ground equipment (MAGE) slings and deployment off-loading devices 42 and 44 installed in the upper wall of the chamber 10. On the floor of the chamber 10, permanently installed work-stands 46 and robotic devices 48 facilitate initial integration of the satellite 12 in the chamber 10.

The advantages of the present invention will be readily apparent to those of ordinary skill in the field of spacecraft design, integration and testing. Integration and test time is greatly reduced; less equipment is needed because there are fewer chambers to construct; and movement of the satellite is minimized so there is less risk of damaging it prior to launch. Further, it is much easier to maintain a clean environment for the satellite if it does not need to be moved from chamber to chamber for different tests. Another advantage is that fewer people need to be involved in the testing, which further enhances the ability to maintain a clean environment.

It will be appreciated from the foregoing that the present invention represents a significant advance in the field of spacecraft manufacture and testing. In particular, the invention simplifies integration and testing of a satellite by combining many testing components in a single test chamber, thereby eliminating the need to setup and teardown multiple tests and the need to transport the satellite to multiple test chambers. Integration and testing of a satellite in accordance with the invention can be accomplished in a matter of months instead of the two years or more required in conventional integration and testing using multiple test chambers. It will also be appreciated that, although a specific embodiment of the invention has been illustrated for purposes of illustration, various modifications may be made without departing from the scope of the invention. Accordingly, the invention should not be limited except as by the appended claims.

What is claimed is:

1. Apparatus for integrating and testing a satellite, comprising:

a test chamber having a movable fixture on which a satellite is installable for testing;

an inlet port for introducing gas at a controlled temperature and pressure for purposes of thermal testing and pressure testing;

a shaking device coupled to the movable fixture, for simulating mechanical vibration of the satellite encountered at launch;

an acoustic source mounted in the chamber to simulate acoustic vibration encountered at launch;

a radio-frequency test antenna mounted in the test chamber to simulate the position of an earth-based antenna;

a sun simulator mounted in the chamber to simulate the angular position and diameter of the sun for purposes of testing a sun sensing device on the satellite; and an earth simulator mounted in the chamber to simulate the angular position and diameter of the earth for purposes of testing an earth sensing device on the satellite.

2. Apparatus as defined in claim 1, wherein:

the movable fixture for supporting the satellite is movable vertically and is capable of rotation about at least two axes to simulate orientation movements of the satellite when in orbit.

3. Apparatus as defined in claim 1, and further comprising:

a permanent source of satellite electrical power in the chamber, to simulate an onboard satellite power source.

4. Apparatus as defined in claim 1, and further comprising:

a permanent data connection through a wall of the chamber, to provide a data connection between the satellite under test and test equipment external to the chamber.

5. Apparatus as defined in claim 1, and further comprising:

at least one additional antenna mounted in the test chamber to provide electromagnetic radiation to test the electromagnetic capatibility (EMC) of the satellite.

6. Apparatus as defined in claim 1, and further comprising:

equipment moving devices permanently installed in the chamber, to facilitate integration of the satellite in the chamber.

7. Apparatus as defined in claim 6, wherein the equipment moving devices include movable slings installed in an upper wall of the chamber.

8. Apparatus as defined in claim 6, wherein the equipment moving devices include robotic assembly devices installed in lower portion of the chamber.

9. A method for integrating and testing a satellite, comprising the steps of:

assembling a satellite on a permanently installed but movable fixture in a test chamber;

rotating, translating and tilting the movable fixture to simulate orientation movements of the satellite for test purposes;

introducing gas into the test chamber and controlling its temperature for purposes of thermal testing;

shaking the movable fixture to simulate mechanical vibration of the satellite encountered at launch;

providing acoustic vibration from an acoustic source mounted in the chamber to simulate acoustic vibration encountered at launch;

transmitting radio-frequency (RF) radiation from an RF test antenna mounted in the chamber to simulate the position of an earth-based antenna;

simulating with a sun simulator mounted in the chamber, the angular position and diameter of the sun for purposes of testing a sun sensing device on the satellite; and simulating with an earth simulator mounted in the chamber, the angular position and diameter of the earth for purposes of testing an earth sensing device on the satellite.

10. A method as defined in claim 9, wherein:

the steps of rotating, translating and tilting the movable fixture include translating the fixture vertically and selectively rotating the fixture about at least two axes.

11. A method as defined in claim 9, and further comprising:

supplying electrical power to the satellite in the chamber through a permanent source of satellite electrical power in the chamber, to simulate an onboard satellite power source.

12. A method as defined in claim 9, and further comprising:

supplying a permanent data connection through a wall of the chamber, to provide a data connection between the satellite under test and test equipment external to the chamber.

13. A method as defined in claim 9, and further comprising:

transmitting RF radiation from at least one additional antenna mounted in the test chamber to test the electromagnetic capatibility (EMC) of the satellite.

14. A method as defined in claim 9, wherein the step of assembling the satellite includes:

employing equipment moving devices permanently installed in the chamber, to facilitate integration of the satellite in the chamber.

15. A method as defined in claim 14, wherein the step of employing equipment moving devices includes employing movable slings installed in an upper wall of the chamber.

16. A method as defined in claim 14, wherein the step of employing equipment moving devices includes employing robotic assembly devices installed in lower portion of the chamber.

* * * * *